United States Patent
Byalskiy et al.

(10) Patent No.: US 8,986,552 B2
(45) Date of Patent: Mar. 24, 2015

(54) CROSS-FLOW FILTRATION WITH TURBULENCE AND BACK-FLUSHING ACTION FOR USE WITH ONLINE CHEMICAL MONITORS

(75) Inventors: Mikhail Byalskiy, Aurora, CO (US); Brian Link, Boulder, CO (US)

(73) Assignee: General Electric Company, Schenectady, NY (US)

( * ) Notice: Subject to any disclaimer, the term of this patent is extended or adjusted under 35 U.S.C. 154(b) by 634 days.

(21) Appl. No.: 12/956,315

(22) Filed: Nov. 30, 2010

(65) Prior Publication Data
US 2012/0132597 A1 May 31, 2012

(51) Int. Cl.
*B01D 29/62* (2006.01)
*G01N 1/22* (2006.01)
*G01N 1/20* (2006.01)
*B01D 29/90* (2006.01)
*B01D 29/66* (2006.01)

(52) U.S. Cl.
CPC .............. *B01D 29/904* (2013.01); *B01D 29/66* (2013.01); *B01D 29/908* (2013.01)
USPC ...... 210/791; 210/251; 73/863.23; 73/863.24

(58) Field of Classification Search
CPC .... B01D 25/001; B01D 29/66; B01D 29/904; B01D 29/908
USPC ................ 210/251, 257.1, 257.2, 323.1, 332, 210/333.01, 348, 407, 411, 456, 499, 767, 210/791, 798; 73/863.28, 863.24, 863.81; 422/63; 436/52
See application file for complete search history.

(56) References Cited

U.S. PATENT DOCUMENTS

| | | | |
|---|---|---|---|
| 3,389,797 A | | 6/1968 | Giardini |
| 4,263,140 A | * | 4/1981 | Wujnovich et al. ............ 210/247 |
| 5,401,397 A | * | 3/1995 | Moorehead ................... 210/108 |
| 5,846,420 A | | 12/1998 | Bolton et al. |
| 6,196,395 B1 | | 3/2001 | Drori |
| 6,562,246 B2 | * | 5/2003 | McGowan ..................... 210/791 |
| 6,675,664 B1 | * | 1/2004 | Lilienthal et al. .......... 73/863.23 |

(Continued)

FOREIGN PATENT DOCUMENTS

| EP | 0688593 A1 | 12/1995 |
|---|---|---|
| GB | 764578 A | 12/1956 |

OTHER PUBLICATIONS

Perry, R.H., Green, D.W., Perry's Chemical Engineers' Handbook, McGraw-Hill (7th ed., 1997), p. 6-46.*

(Continued)

*Primary Examiner* — Lore Jarrett
*Assistant Examiner* — Patrick Orme
(74) *Attorney, Agent, or Firm* — Wegman, Hessler & Vanderburg

(57) ABSTRACT

A filtration and monitoring system. An inlet pipe provides fluid to a filter block chamber and has an inlet valve located therein configured to shut off the flow of the fluid through the inlet pipe. A filtered fluid conduit fluidically connects the filter block with the monitoring device. The outlet axis of the outlet pipe in the filter chamber is offset from the inlet axis of the inlet pipe such that the fluid undergoes a change of direction while passing through the filter block chamber thereby causing turbulent flow within the filter block chamber to reduce the buildup of filter cake on the filter element. Closing the inlet valve block, results in a back-flushing flow of fluid through the filter element from a pressure accumulator located in the filtered fluid conduit.

15 Claims, 2 Drawing Sheets

(56) References Cited

U.S. PATENT DOCUMENTS 7,540,206 B2 * 6/2009 Gibson et al. .............. 73/864.62
8,146,444 B2 * 4/2012 Shin ........................... 73/863.23

OTHER PUBLICATIONS

Perry, R.H, Green, D.W., Perry's Chemical Engineers' Handbook McGraw-Hill (6th ed.1984), p. 5-6.*
Cheremisinoff, Nicholas P., Liquid Filtration, (2d ed. 1998), pp. 24-25.*
Cheremisinoff, Nicholas P., Liquid Filtration, (2d ed. 1998) at pp. 24-25.*
Search Report and Written Opinion from corresponding PCT Application No. PCT/US2011/057031 dated Feb. 17, 2012.

* cited by examiner

CROSS-FLOW FILTRATION WITH TURBULENCE AND BACK-FLUSHING ACTION FOR USE WITH ONLINE CHEMICAL MONITORS

BACKGROUND OF THE INVENTION

1. Field of the Invention

The invention relates to filtration systems used with chemical monitoring systems and, more particularly, to a filtration system configured to use turbulent and reverse flow to remove contaminants from its filter element.

2. Description of Related Art

Chemical monitoring sensors often require a filtered supply of a coolant, lubricant, fuel, water or other fluid to be monitored to maintain the proper operation and maintenance of a multitude of industrial systems. Unfortunately, the filter elements utilized to filter such fluids must be periodically replaced or cleansed to remove a clogging accumulation of contaminants and foreign matter therefrom. The periodic removal and replacement of a clogged filter element generally requires the shutting down of the industrial system during the replacement procedure. The expensive, nonproductive downtime of the industrial system, the replacement cost of the filter element and the expenses incurred to properly dispose of the soiled filter element and the contents thereof in accordance with the ever-increasing degree of governmental and environmental mandates, make cleansing systems for filter elements desirable.

It therefore would be desirable to have an improved filter element cleansing system that reduces the operational cost of filtering and associated systems by extending the usable life of the filter elements, by reducing the systems' downtime required to replace filter elements and by reducing disposal costs.

SUMMARY OF THE INVENTION

In one aspect, the invention is directed to a filtration and monitoring system for online monitoring of a parameter in a fluid system. The filtration and monitoring system includes an online monitoring device and a filter block forming a chamber therein and having a filter element. An inlet pipe provides fluid to the filter block chamber. The inlet pipe defines an inlet axis and further has an inlet valve located therein configured to shut off the flow of the fluid through the inlet pipe. An outlet pipe removes fluid from the filter block chamber, wherein the outlet pipe defines an outlet axis. A filtered fluid conduit fluidically connects the filter block with the monitoring device. The outlet axis of the outlet pipe is offset from the inlet axis of the inlet pipe such that the fluid undergoes a change of direction while passing through the filter block chamber thereby causing turbulent flow within the filter block chamber. The turbulent flow produces a cleaning vortex flow within the filter block that sweeps off particles that accumulate on the filter block chamber-side of the filter element to reduce the buildup of filter cake on the filter element. Closing the inlet valve causes a relatively sharp stop to the flow of fluid through the filter block resulting in a back-flushing flow of fluid from a pressure accumulator located in the filtered fluid conduit to the filter block chamber through the filter element. The back-flushing flow of fluid dislodges filter cake accumulated on the filter block chamber-side of the filter element.

Another aspect of the invention is directed to a method of cleaning a filter element in the online fluid monitoring system. The method includes delivering fluid to a chamber in a filter block through an inlet pipe, the inlet pipe having an inlet valve therein configured to shut off the flow of fluid through the inlet pipe. A portion of the fluid entering the chamber is filtered with a filter element and then directed toward a monitoring device through a filtered fluid conduit. The filtered fluid conduit has a pressure accumulator located therein. The method also includes producing a turbulent cleaning flow within the chamber to sweep off particles that accumulate on the chamber-side of the filter element to reduce the buildup of filter cake on the filter element by removing fluid from the chamber through an outlet pipe with an outlet axis that is offset from the inlet axis of the inlet pipe. The offsetting inlet and outlet axes cause the fluid to undergo a change of direction while passing through the filter block chamber. Periodically, the filter element is back-flushed by closing the inlet valve in the inlet pipe to stop to the flow of fluid through the filter block. Closing the inlet valve results in a back-flushing flow of fluid from the pressure accumulator to the filter block chamber through the filter element, which dislodges filter cake accumulated on the chamber-side of the filter element.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, and equivalents as will become apparent from consideration of the following detailed description.

Figure 1:
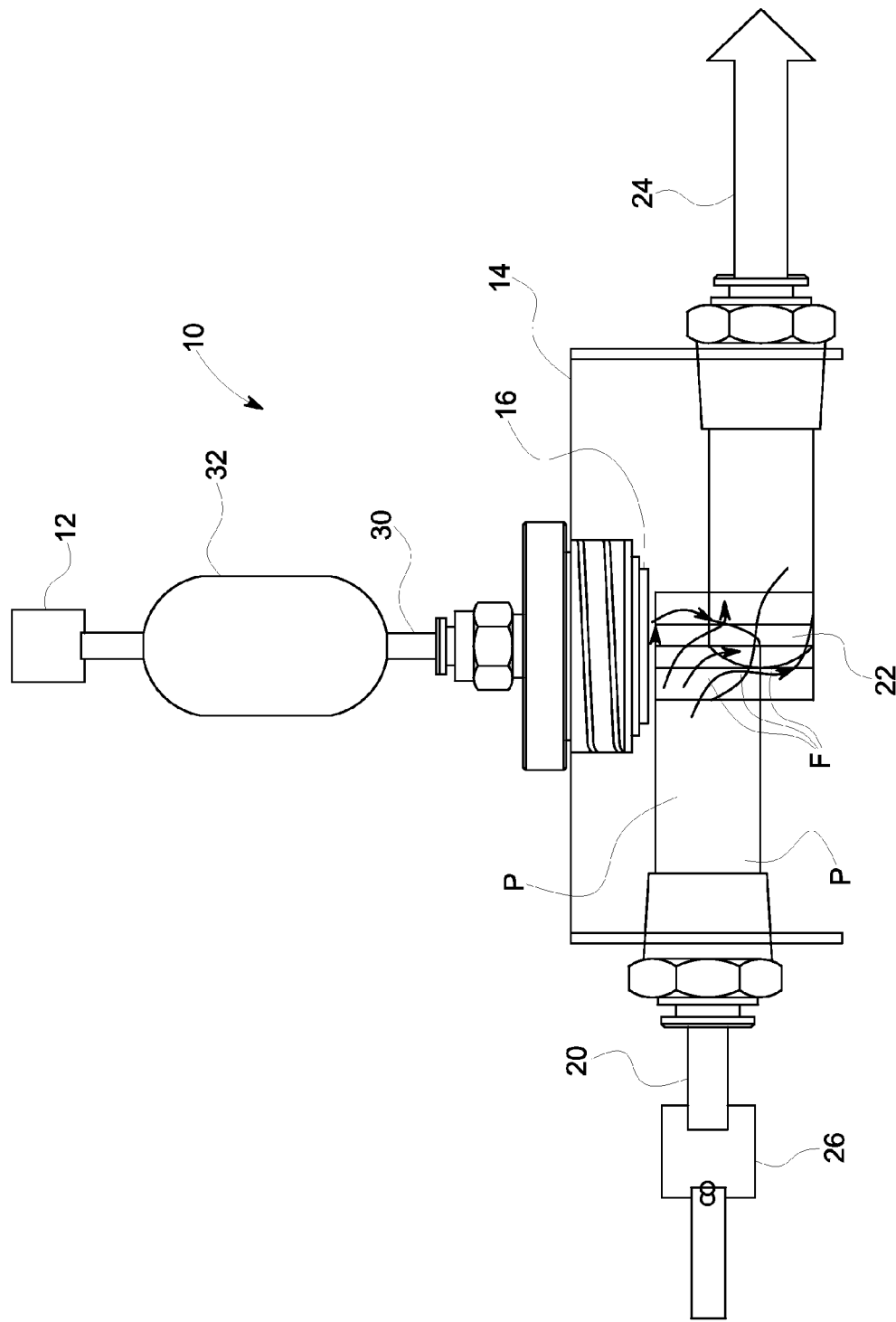
FIG. 1 illustrates a schematic view of a online fluid monitoring system according to an embodiment of the invention.
Figure 2:
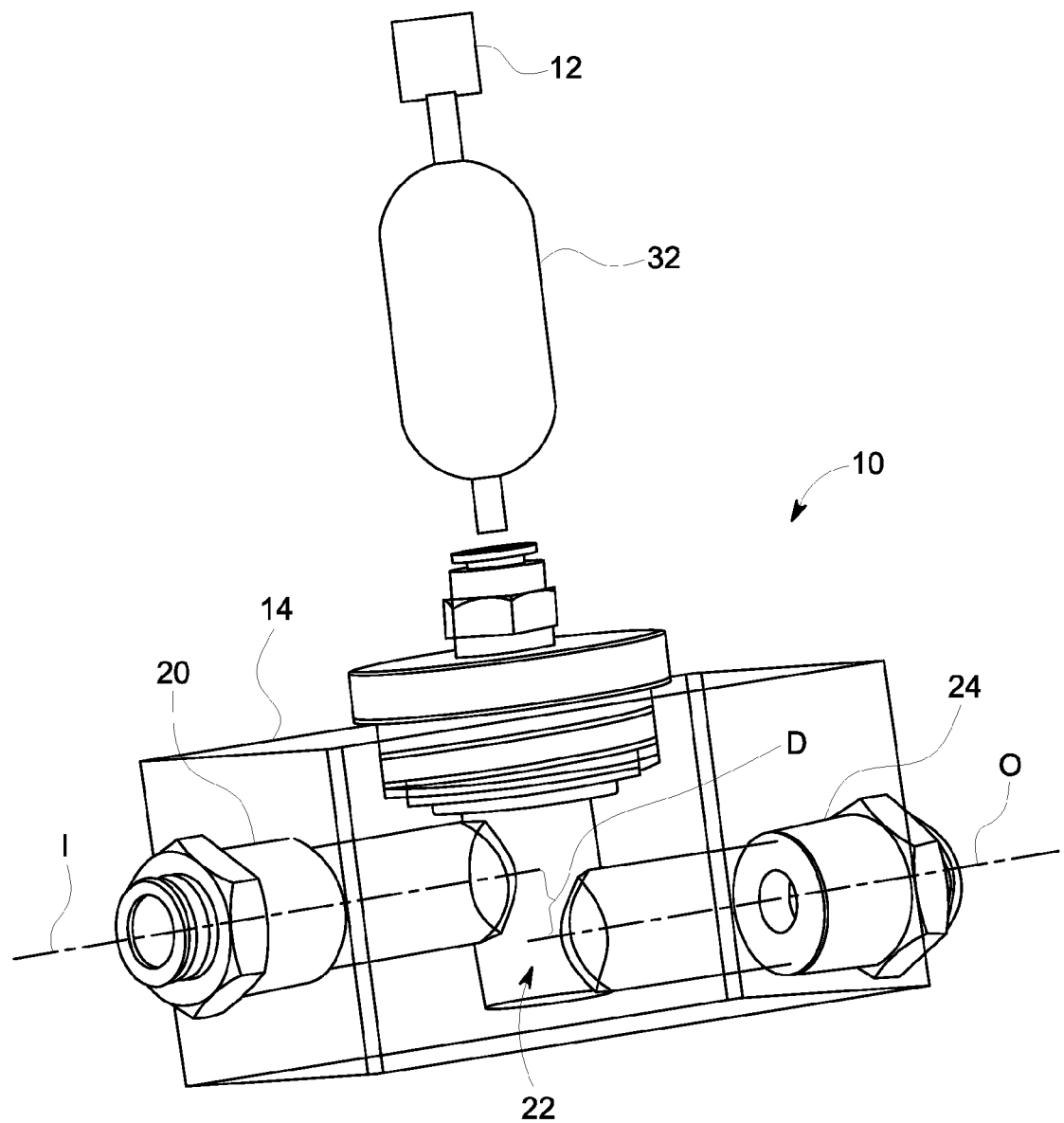
FIG. 2 illustrates a partially transparent and exploded perspective view of the online fluid monitoring system of FIG. 1.

Referring to FIGS. 1 and 2, an online filtration system 10 used in conjunction with a chemical monitoring device for a fluid system such as an industrial cooling water system, boiler water system, waste water system, pulp paper water system, or other fluid system. Generally, the filtration system 10 is used with an online monitoring device 12 capable of monitoring a desired parameter of the fluid in the fluid system and a filter block 14 having a filter element 16 enclosed therein for providing filtered fluid to the monitoring device 12. The monitoring device 12 may be any known sensor capable of monitoring a parameter such as salinity, phosphates, polymer, pH or other desired parameter. Alternately, the monitoring device 12 may be a fluid sampling mechanism through which a fluid sample may be drawn from the fluid system for offline testing without departing from the scope of the invention.

An inlet pipe 20 having inlet axis I is provided for introducing a supply of fluid to a filter block chamber 22 in the filter block 14. An outlet pipe 24 having outlet axis O removes the fluid from the filter block 14. An inlet valve 26 is utilized to shut off or regulate the flow of the fluid through the inlet pipe 20. Inlet valve 26 may be any type of manually or automatically operated valve known to those skilled in the art.

A filtered fluid conduit 30 connects the filter block 14 with the monitoring device 12. Accordingly, the filter block chamber 22 in the filter block 14 is in fluid communication with the monitoring device 12 and designed for cross flow filtration such that a small portion of the fluid flow entering the filter block chamber 22 proceeds through the filter element 16 and is directed to the monitoring device 12 through the filtered fluid conduit 30. The filter element 16 is preferably made of nylon or steel mesh having a pore size of between about 1 and 50 μm but may be made of any other material known to those skilled in the art. As is known in the art, the filter element 16 may be periodically removed from the filter block 14 for cleaning and/or replacement.

A pressure accumulator 32 is located in the filtered fluid conduit 30 between the filter block 14 and the monitoring device 12. Desirably, the pressure accumulator 32 has a volume of between about 25 percent and 100 percent of the volume of the filter block chamber 22, and more desirably between about 40 and about 60 percent of the volume of the filter block chamber.

According to the invention, the outlet axis O of the outlet pipe 24 is offset from the inlet axis I of the inlet pipe 20. The outlet axis O may be offset vertically, horizontally and/or angularly or any combination thereof from the inlet axis I such that the fluid undergoes a change of direction while passing through the filter block chamber 22, thereby causing turbulent flow within the filter block chamber 22. Desirably, the offset between the outlet axis O and the inlet axis I has a distance component D of at least between about 2 and 5 cm. The turbulent flow produces a cleaning vortex flow within the filter block 14 that sweeps off particles P that accumulate on the filter block chamber-side of the filter element 16 to reduce the buildup of a filter cake. FIG. 1 illustrates turbulent flow lines within the filter block chamber 22 as indicated by lines indicated by reference F.

While the turbulent flow within the filter block chamber 22 reduces filter cake buildup, periodically it is desirable to further clean the filter element 16 without having to remove it from the filter block 14. The disclosed filtration system 10 enables a back-flushing flow of fluid through the filter element 16 to further clean the filter element 16. Closing the inlet valve 26 causes a relatively sharp stop to the flow of fluid through the filter block 14. The accompanying pressure drop in the filter block chamber 22 caused by termination of fluid flow from the inlet pipe 20 to the filter block chamber 22 results in the pressure in pressure accumulator 32 being greater than the pressure inside the filter block chamber 22. This pressure differential between the pressure accumulator 32 and the filter block chamber 22 results in a back-flushing flow of fluid from the pressure accumulator 32 to the filter block chamber 22 through the filter element 16. The back-flushing flow dislodges any filter cake accumulated on the filter block chamber-side of the filter element 16 and pushes the dislodged filter cake down into the filter block chamber 22. When fluid flow is restored by opening the inlet valve 26, the fluid stream through the filter block 14 pushes the remains of the filter cake out of the filter block chamber 22 and through the outlet pipe 24. Fluid again passes through the filter element 16 toward the monitoring device 12 and replenishes the pressure accumulator 32 such that the filtration system 10 returns to its normal filtering and monitoring operations.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A filtration and monitoring system for online monitoring of a parameter in a fluid system, the filtration and monitoring system comprising:
   an online monitoring device configured to monitor a parameter of a sample portion of a fluid flowing through the fluid system;
   a filter block forming a filter block chamber therein and comprising a filter element;
   an inlet pipe providing fluid to the filter block chamber, said inlet pipe defining an inlet axis and further having an inlet valve located therein configured to shut off the flow of the fluid through said inlet pipe;
   an outlet pipe removing fluid from the filter block chamber, said outlet pipe defining an outlet axis;
   a filtered fluid conduit fluidically connecting the filter block with the online monitoring device to transport said sample portion of said fluid to said monitoring device, said filtered fluid conduit having a pressure accumulator located therein between said online monitoring device and said filter element, said pressure accumulator accumulating fluid therein;
   said inlet pipe, outlet pipe, and filter element configured such that said filter element is orientated substantially parallel to said inlet axis and said outlet axis to provide a cross flow filtration path for said fluid and defining a sample flow path wherein only said sample portion of said fluid flows through said filter element to said online monitoring device with the remainder of said fluid passing tangentially and not passing through said filter element thereby exiting said filter block chamber through said outlet pipe;
   wherein the outlet axis of the outlet pipe is offset from the inlet axis of the inlet pipe such that the fluid undergoes a change of direction while passing through the filter block chamber thereby causing turbulent flow within the filter block chamber to sweep particles off of said filter element; and
   wherein when said inlet valve in the inlet pipe is closed, the flow of fluid through the filter block stops, thereby resulting in a back-flushing flow of fluid from the pressure accumulator to the filter block chamber through the filter element, thereby dislodging filter cake accumulated on the chamber-side of the filter element so that said accumulated filter cake is removed through said outlet pipe.

2. The filtration and monitoring system of claim 1 wherein the monitoring device is a sensor capable of monitoring a parameter of the fluid.

3. The filtration and monitoring system of claim 1 wherein the monitoring device is a fluid sampling mechanism through which a fluid sample is be drawn from the fluid system.

4. The filtration and monitoring system of claim 1 wherein the filter element is made of nylon or steel mesh having a pore size of between about 1 and 50 μm.

5. The filtration and monitoring system of claim 1 wherein the pressure accumulator has a volume between about 40 and about 60 percent of the volume of the filter block chamber.

6. The filtration and monitoring system of claim 1 wherein the outlet axis is offset vertically from the inlet axis.

7. The filtration and monitoring system of claim 1 wherein the outlet axis is offset horizontally from the inlet axis.

8. The filtration and monitoring system of claim 1 wherein the outlet axis is offset orthogonally from the inlet axis either vertically or horizontally.

9. The filtration and monitoring system of claim 1 wherein the outlet axis is offset orthogonally from the inlet axis both vertically and horizontally.

10. The filtration and monitoring system of claim 1 wherein the outlet axis is offset orthogonally from the inlet axis by a vertical distance between about 2 and 5 cm.

11. A method of cleaning a filter element in an online fluid monitoring system, the method comprising:
   delivering fluid to a chamber in a filter block having an inlet pipe and an outlet pipe, said inlet pipe having an inlet valve therein selectively configured to shut off the flow of fluid through said inlet pipe or allow fluid flow through said inlet valve to exit from said outlet pipe;
   disposing said filter element in said filter block and in communication with a filtered fluid conduit, said filtered fluid conduit comprising a monitoring device and a pressure accumulator interposed between said filter element and said monitoring device for accumulating fluid under pressure therein
   providing a cross flow filtration path for said fluid defining a flow path wherein only a sample portion of said fluid flows through said filter element to said monitoring device with remaining fluid passing tangentially and not passing through said filter element and exiting said filter block chamber through said outlet pipe
   producing a turbulent cleaning flow within the chamber to sweep off particles that accumulate on the chamber-side of the filter element to reduce the buildup of filter cake on the filter element by removing fluid from the chamber through said outlet pipe, said outlet pipe having outlet axis that is offset from the inlet axis of the inlet pipe such that the fluid undergoes a change of direction while passing through the filter block chamber; and
   periodically back-flushing the filter element by closing the inlet valve in the inlet pipe to stop to the flow of fluid through the filter block thereby resulting in a back-flushing flow of fluid from the pressure accumulator to the filter block chamber through the filter element to dislodge filter cake accumulated on the chamber-side of the filter element, and removing said accumulated filter cake through said outlet pipe.

12. The method of claim 11 wherein the monitoring device comprises a sensor, the method further comprising monitoring a parameter of the fluid with said sensor.

13. The method of claim 11 wherein the monitoring device comprises a fluid sampling mechanism, the method further comprising drawing a fluid sample from the fluid monitoring system.

14. The method of claim 11 wherein the turbulent flow is produced by vertically offsetting the outlet axis from the inlet axis.

15. The method of claim 11 wherein the turbulent flow is produced by horizontally offsetting the outlet axis from the inlet axis.

* * * * *

UNITED STATES PATENT AND TRADEMARK OFFICE
CERTIFICATE OF CORRECTION

PATENT NO. : 8,986,552 B2  Page 1 of 1
APPLICATION NO. : 12/956315
DATED : March 24, 2015
INVENTOR(S) : Byalskiy et al.

It is certified that error appears in the above-identified patent and that said Letters Patent is hereby corrected as shown below:

In the claims,

In Column 4, Line 67, in Claim 3, delete "is be" and insert -- is to be --, therefor.

Signed and Sealed this
Third Day of May, 2016

Michelle K. Lee
*Director of the United States Patent and Trademark Office*